(12) United States Patent
Zhang et al.

(10) Patent No.: US 11,778,990 B2
(45) Date of Patent: Oct. 10, 2023

(54) AUTOMATIC FOOD FEEDER FOR AQUACULTURE BREEDING

(71) Applicant: ZHEJIANG OCEAN UNIVERSITY, Zhoushan (CN)

(72) Inventors: Yin Zhang, Zhoushan (CN); Hanhao Zhu, Zhoushan (CN); Yeyi Si, Zhoushan (CN); Chenchen Lin, Zhoushan (CN); Yue Pan, Zhoushan (CN); Qingqian Xu, Zhoushan (CN); Guiming He, Zhoushan (CN); Kangkang Jian, Zhoushan (CN); Yiwei Yao, Zhoushan (CN); Zhigang Chai, Zhoushan (CN); Xu Liu, Zhoushan (CN); Jiahui Wang, Zhoushan (CN); Zhiqiang Cui, Zhoushan (CN); Qile Wang, Zhoushan (CN)

(73) Assignee: ZHEJIANG OCEAN UNIVERSITY, Zhoushan (CN)

( * ) Notice: Subject to any disclaimer, the term of this patent is extended or adjusted under 35 U.S.C. 154(b) by 0 days.

(21) Appl. No.: 18/190,129

(22) Filed: Mar. 27, 2023

(65) Prior Publication Data
US 2023/0232792 A1 Jul. 27, 2023

Related U.S. Application Data

(63) Continuation of application No. PCT/CN2022/134278, filed on Nov. 25, 2022.

(30) Foreign Application Priority Data

Dec. 17, 2021 (CN) .......................... 202111548184.1

(51) Int. Cl.
*A01K 61/85* (2017.01)

(52) U.S. Cl.
CPC .................................. *A01K 61/85* (2017.01)

(58) Field of Classification Search
CPC ......... A01K 61/85; A01K 61/80; A23K 50/80
(Continued)

(56) References Cited

U.S. PATENT DOCUMENTS 6,631,695 B2 * 10/2003 Shin ...................... A01K 5/002
119/57.4
2003/0070624 A1 4/2003 Zohar et al.
(Continued)

FOREIGN PATENT DOCUMENTS

CN 205511662 U 8/2016
CN 108651352 * 10/2018 ............. A01K 61/80
(Continued)

*Primary Examiner* — Andrea M Valenti
(74) *Attorney, Agent, or Firm* — True Shepherd LLC; Andrew C. Cheng

(57) ABSTRACT

An automatic food feeder for aquatic breeding comprises a bottom plate; the lower side of the bottom plate is provided with a driving mechanism, and the driving mechanism comprises four groups of rotating shafts located on the lower side of the bottom plate; gears are sleeved on the outer sides of the two groups of rotating shafts, and a conveyor belt is connected between the two groups of gears; a plurality of groups of meshing teeth matched with the gears are uniformly provided on the inner side of the conveyor belt, and a plurality of groups of electric telescopic push blocks are uniformly arranged on the outer side of the conveyor belt; a placing rack is connected on the upper side of the bottom plate, and a control box is connected on the front part of the lower side of the placing rack.

6 Claims, 5 Drawing Sheets

(58) Field of Classification Search
USPC ... 119/51.04, 200, 212, 230, 242, 51.01, 47, 119/57.1, 57.2
See application file for complete search history.

(56) References Cited

U.S. PATENT DOCUMENTS

2007/0151522 A1   7/2007   Brauman
2009/0145368 A1   6/2009   Brauman

FOREIGN PATENT DOCUMENTS

| CN | 110637768 | * | 1/2020 | ............ A01K 61/80 |
| --- | --- | --- | --- | --- |
| CN | 209914785 U | | 1/2020 | |
| CN | 210045373 U | | 2/2020 | |
| CN | 112021237 | * | 12/2020 | ............ A01K 61/80 |
| CN | 112471039 A | | 3/2021 | |
| CN | 112616743 A | | 4/2021 | |
| CN | 108401957 | * | 6/2021 | ............ A01K 61/80 |
| CN | 112868583 A | | 6/2021 | |
| CN | 214593515 U | | 11/2021 | |
| EP | 0481932 A1 | | 4/1992 | |
| JP | 2016202094 A | | 12/2016 | |
| WO | 2016094986 A1 | | 6/2016 | |

\* cited by examiner

AUTOMATIC FOOD FEEDER FOR AQUACULTURE BREEDING

CROSS-REFERENCE TO RELATED APPLICATIONS

This application is a continuation of International Patent Application No. PCT/CN2022/134278 with a filing date of Nov. 25, 2022, designating the United States, now pending, and further claims priority to Chinese Patent Application No. 202111548184.1 with a filing date of Dec. 17, 2021. The content of the aforementioned applications, including any intervening amendments thereto, are incorporated herein by reference.

TECHNICAL FIELD

The present invention relates to the technical field of aquaculture breeding equipment, in particular to an automatic food feeder for aquaculture breeding.

BACKGROUND

With the use of antibiotics and other drugs, the density of aquaculture breeding has greatly increased, and the yield per pond of aquaculture breeding seedlings has increased several times compared with the past. With the increase of the density of fish ponds, the requirements of various facilities are higher, such as more efficient water exchange system and cleaning system, seedling feeding, and more accurate temperature control system. At the same time, the frequency and quantity of feed are beyond the scope of manual operation, and aquaculture breeding bases are gradually pursuing more advanced automatic food feeders to replace traditional manual feeding, saving labor costs, ensuring seedling quality and preventing losses caused by personnel operation errors.

The existing food feeder for seedling cultivation generally includes mechanisms such as stirring, mixing and extruding to ensure that different feeds and medicines are evenly mixed into the food feeder and fed into the fish pond. However, the existing food feeder still needs manual operation to move it to all parts of the fish pond and feed it evenly, and the feeding efficiency is low.

SUMMARY OF PRESENT INVENTION

The present invention aims to solve the problem of low feeding efficiency, and provides an automatic food feeder for aquatic breeding.

In order to solve the above technical problems, the technical scheme provided by the present invention is as follows: an automatic food feeder for aquatic breeding includes a bottom plate; a lower side of the bottom plate is provided with a driving mechanism; the driving mechanism comprises four groups of rotating shafts located at the lower side of the bottom plate; gears are sleeved outside two groups of rotating shafts located at a front side, and a conveyor belt is connected between two groups of the gears; an inner side of the conveyor belt is uniformly provided with a plurality of groups of meshing teeth matched with the gears; an outer side of the conveyor belt is uniformly provided with a plurality of groups of electric telescopic push blocks; an upper side of the bottom plate is provided with a placing rack; a front part of a lower side of the placing rack is provided with a control box, a telescopic rod is hinged at a lower side of the placing rack and a right side of the control box; a toggle lever is hinged at a lower end of the telescopic rod; one side of a front part of the bottom plate is provided with a rectangular through hole, and a lower part of the toggle lever passes through the rectangular through hole; a cross bar rotates through and is connected with part of the toggle lever located at an inner side of the rectangular through hole; the two ends of the cross bar are respectively rotatably connected with the front and rear side walls of the rectangular through hole; a spring is sleeved outside the cross bar, and one end of the spring is provided with the toggle lever and the other end is provided with an inner side wall of the rectangular through hole; a storage box is connected to an upper side of the placing rack, and a stirring mechanism is arranged in the storage box; a discharge pipe pass through one side of a lower side wall of the storage box, and a lower end of the discharge pipe has a plate structure; a second motor is connected above the bottom plate and below a lower end of the discharge pipe; a screw shaft is arranged in the discharge pipe, and a sealing bearing passes through a center of the lower side wall of the discharge pipe; a low end of the screw shaft passes through an inner side of the sealing bearing in a sealing manner and connected with a shaft end of the second motor; a low part of a rear side wall of the discharge pipe is communicated and connected with a material conveying pipe, and the other end of the material conveying pipe is provided with a material spraying head; the material conveying pipe is provided with a material control valve.

After adopting the above structure, the present invention has the following advantages: the driving mechanism is used to replace the manual moving of the food box, which saves more manpower; the upper end of the toggle lever is always pressed on the control button by two groups of springs, and the toggle lever is pushed in turn by a plurality of groups of electric telescopic push blocks outside the meshing teeth, so that the other end of the toggle lever is separated from the control button; after the control button is released, the signal is transmitted to the control box, and the second motor and the material control valve are turned on by the control box, so that the food in the storage box is conveyed to the material conveying pipe through the screw shaft and sprayed to the fish pond through the material spraying head, and the food can be sprayed to the fish pond evenly in different regions, thereby improving the feeding efficiency.

As an improvement, the driving mechanism further includes a support plate which is located at a lower side of the bottom plate and connected to left and right sides; a double-shaft motor is connected to a lower side of the support plate, and two shaft ends of the double-shaft motor are respectively connected with the rotating shaft, and the other end of the rotating shaft is connected with a traveling wheel; a track matched with the traveling wheel is arranged below the traveling wheel and placed on the ground, and two ends of the track are connected with baffles.

As an improvement, two groups of damping rods (32) are respectively connected at the centers of the left and right sides of the bottom plate (1); a push plate (33) is connected between the other ends of the two groups of damping rods (32); a pressing rod (34) is provided at one side of the push plate (33) close to the bottom plate (1) and between the two groups of damping rods (32); reverse control buttons (31) matched with the double-shaft motor (3) are provided the left and right sides of the bottom plate (1) and between the two groups of damping rods (32). Through the two groups of damping rods between the push plate and the bottom plate, the food feeder can be buffered to some extent when it hits the baffle, so as to prevent the parts of the food feeder from being damaged; when the food feeder collides with the baffle, the pressing rod presses the reverse control button of the double-shaft motor to make the double-shaft motor reverse, and the control box controls the electric telescopic push block to retract while receiving the signal of the reverse control button to prevent the electric telescopic push block from colliding with the toggle lever.

As an improvement, the stirring mechanism includes a connecting rod rotatably connected between two opposite side walls of the storage box, and a plurality of groups of stirring rods are connected to the connecting rod; an outer wall of one side of the storage box is provided with a first motor, and a shaft end of the first motor passes through a side wall of the storage box and is connected with one end of the connecting rod.

As an improvement, a height of a lower end of the toggle lever is lower than a height of an upper side of the electric telescopic push block after extending out.

As shown in the figures: 1, Bottom plate; 2, Support plate; 3, Double-shaft motor; 4, Rotating shaft; 5, Travelling wheel; 6, Gear; 7, Conveyor belt; 8, Meshing teeth; 9, Electric telescopic push block; 10, Placing rack; 11, Control box; 12, Control button; 13, Telescopic rod; 14, Toggle lever; 15, Cross bar; 16, Spring; 17, Rectangular through hole; 18, Storage box; 19, Connecting rod; 20, Stirring rod; 21, First motor; 22, Discharge pipe; 23, Sealing bearing; 24, Screw shaft; 25, Second motor; 26, Material conveying pipe; 27, Spray head; 28, Material control valve; 29, Track; 30, Baffle; 31, Reverse control button; 32, Damping rod; 33, Push plate; 34, Pressing rod.

DESCRIPTION OF EMBODIMENTS

The present invention will be further described in detail with reference to the drawings.

Figure 1:
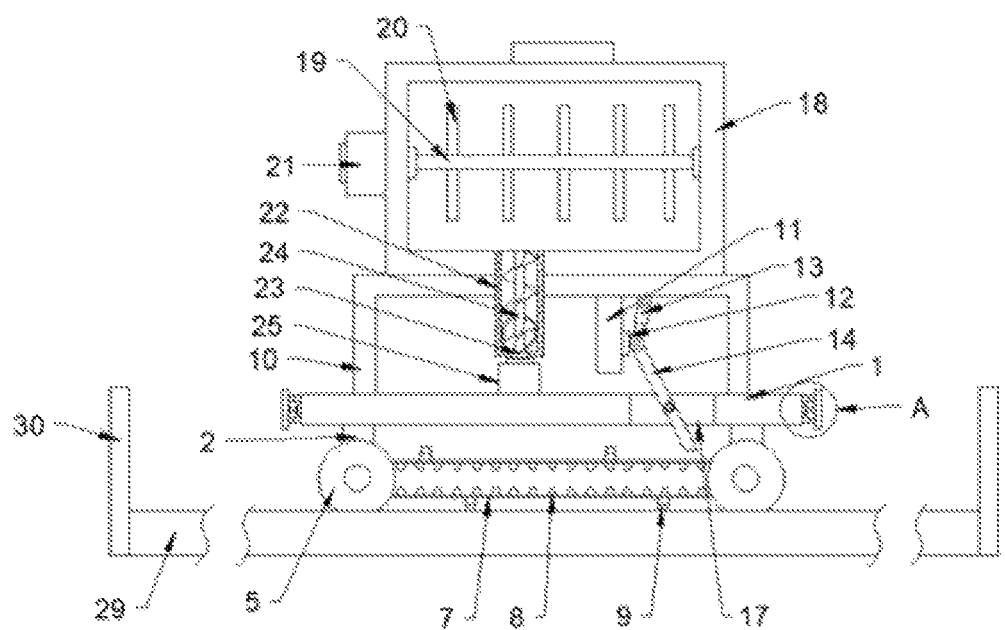
FIG. 1 is a structural front view of an automatic food feeder for aquatic breeding according to the present invention.
Figure 2:
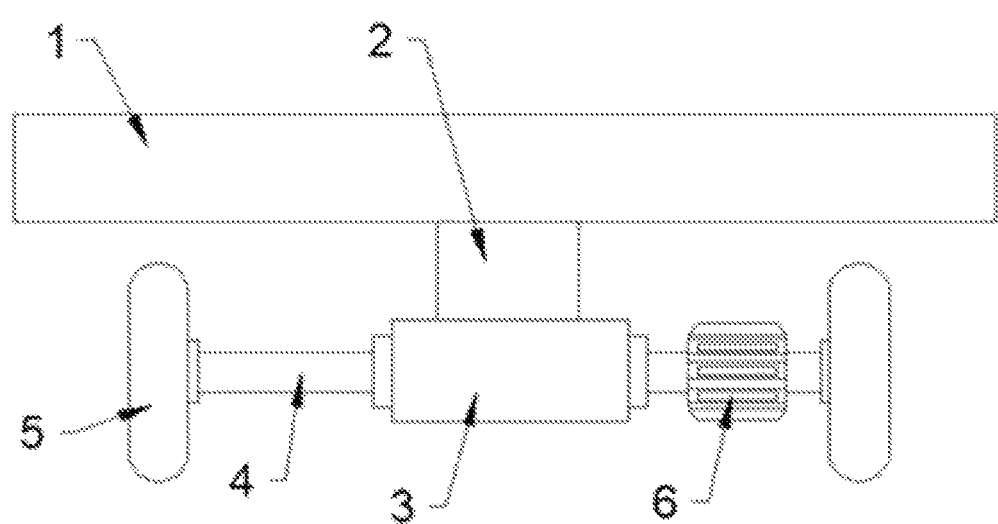
FIG. 2 is a structural diagram of a driving mechanism of an automatic food feeder for aquatic breeding according to the present invention.
Figure 3:
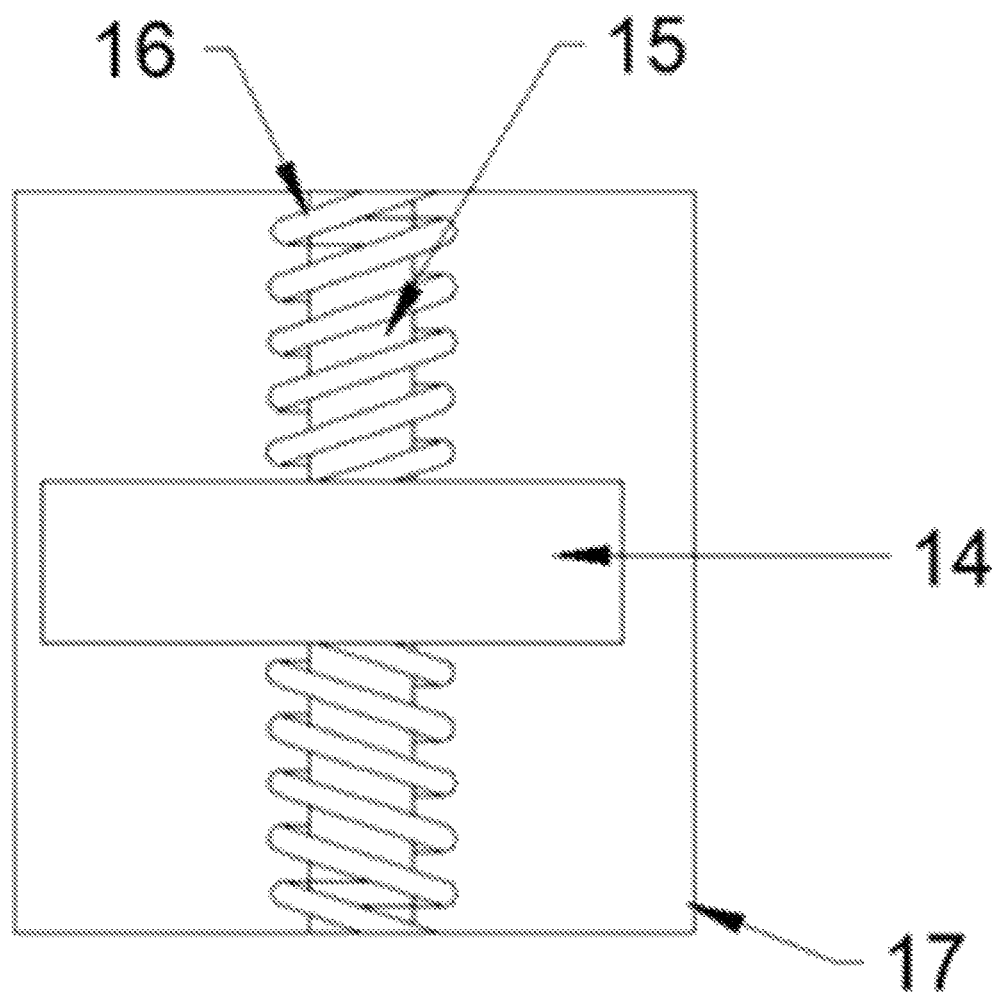
FIG. 3 is an internal connection structure diagram of a rectangular through hole of an automatic food feeder for aquatic product breeding.
Figure 4:
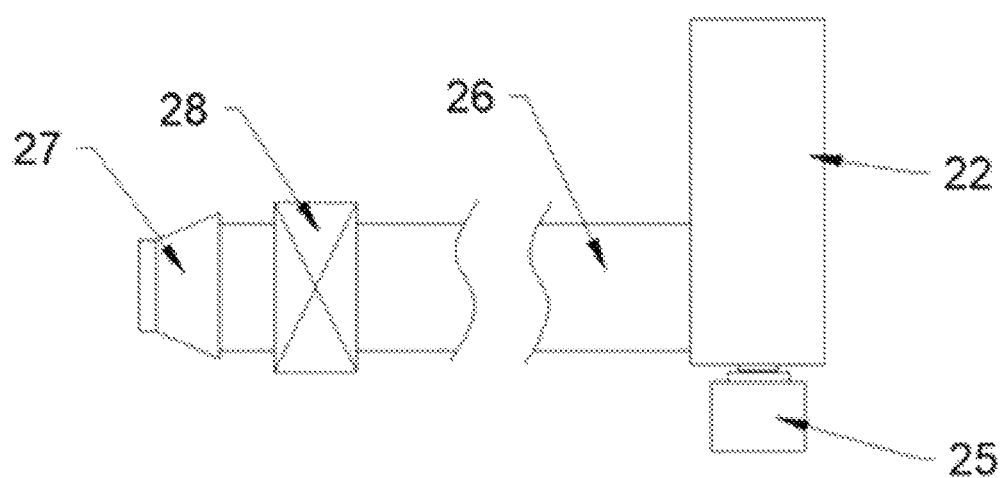
FIG. 4 is a connection structure diagram of a feeding pipe of an automatic food feeder for aquatic product breeding according to the present invention.
Figure 5:
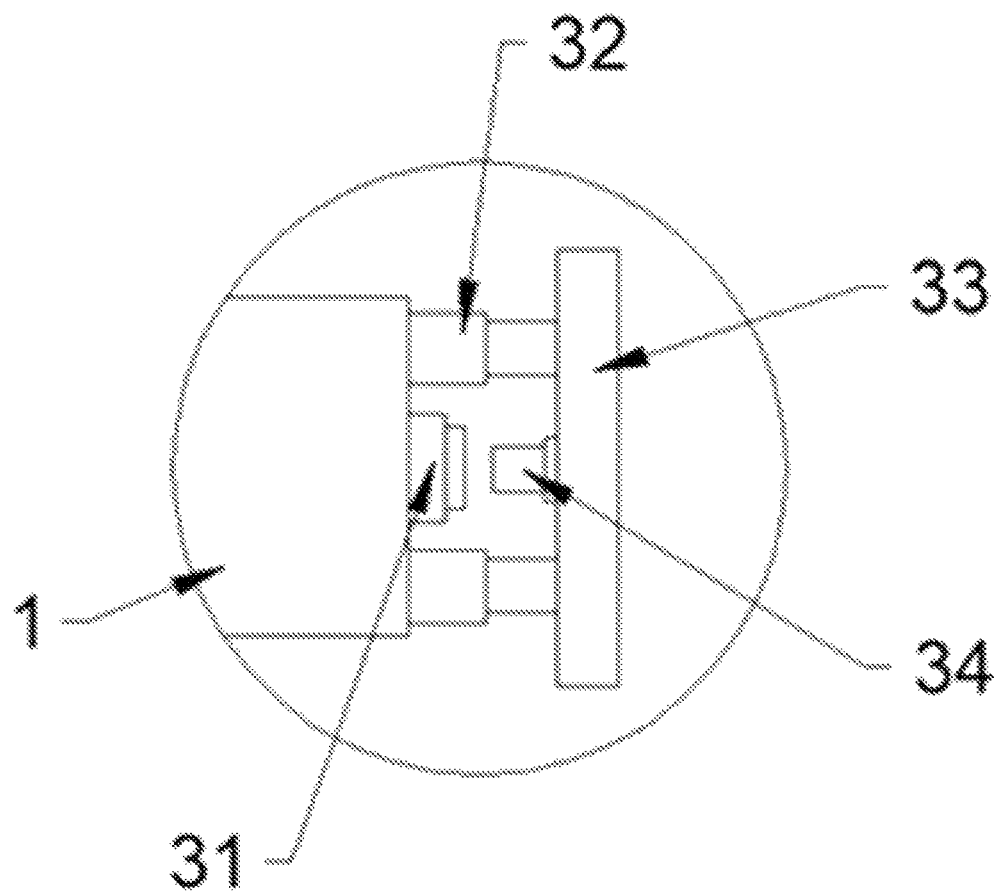
FIG. 5 is an enlarged view of an automatic food feeder for aquatic breeding of the present invention.

With reference to FIGS. 1-5, an automatic food feeder for aquatic breeding includes a bottom plate 1, wherein a lower side of the bottom plate 1 is provided with a driving mechanism; the driving mechanism comprises four groups of rotating shafts 4 located at the lower side of the bottom plate 1; gears 6 are sleeved outside two groups of rotating shafts located at a front side, and a conveyor belt 7 is connected between two groups of the gears 6; an inner side of the conveyor belt 7 is uniformly provided with a plurality of groups of meshing teeth 8 matched with the gears 6; an outer side of the conveyor belt 7 is uniformly provided with a plurality of groups of electric telescopic push blocks 9; an upper side of the bottom plate 1 is provided with a placing rack 10; a front part of a lower side of the placing rack 10 is provided with a control box 11, a telescopic rod 13 is hinged at a lower side of the placing rack 10 and a right side of the control box; a toggle lever 14 is hinged at a lower end of the telescopic rod; one side of a front part of the bottom plate 1 is provided with a rectangular through hole 17, and a lower part of the toggle lever 14 passes through the rectangular through hole 17; a cross bar 15 rotates through and is connected with part of the toggle lever 14 located at an inner side of the rectangular through hole; the two ends of the cross bar 15 are respectively rotatably connected with the front and rear side walls of the rectangular through hole 17; a spring 16 is sleeved outside the cross bar 15, and one end of the spring 16 is provided with the toggle lever 14 and the other end is provided with an inner side wall of the rectangular through hole 17; a storage box 18 is connected to an upper side of the placing rack 10, and a stirring mechanism is arranged in the storage box 18; a discharge pipe 22 pass through one side of a lower side wall of the storage box 18, and a lower end of the discharge pipe 22 has a plate structure; a second motor 25 is connected above the bottom plate 1 and below a lower end of the discharge pipe 22; a screw shaft 24 is arranged in the discharge pipe 22, and a sealing bearing 23 passes through a center of the lower side wall of the discharge pipe 22; a low end of the screw shaft 24 passes through an inner side of the sealing bearing 23 in a sealing manner and connected with a shaft end of the second motor 25; a low part of a rear side wall of the discharge pipe 22 is communicated and connected with a material conveying pipe 26, and the other end of the material conveying pipe 26 is provided with a material spraying head 27; the material conveying pipe 26 is provided with a material control valve 28.

The driving mechanism further comprises a support plate 2 which is located at a lower side of the bottom plate 1 and connected to left and right sides; a double-shaft motor 3 is connected to a lower side of the support plate 2, and two shaft ends of the double-shaft motor 3 are respectively connected with the rotating shaft 4, and the other end of the rotating shaft 4 is connected with a traveling wheel 5; a track 29 matched with the traveling wheel 5 is arranged below the traveling wheel 5 and placed on the ground, and two ends of the track 29 are connected with baffles 30.

Two groups of damping rods 32 are respectively connected at the centers of the left and right sides of the bottom plate 1; a push plate 33 is connected between the other ends of the two groups of damping rods 32; a pressing rod 34 is provided at one side of the push plate 33 close to the bottom plate 1 and between the two groups of damping rods 32; reverse control buttons 31 matched with the double-shaft motor 3 are provided the left and right sides of the bottom plate 1 and between the two groups of damping rods 32. Through the two groups of damping rods 32 between the push plate 33 and the bottom plate 1, the food feeder can be buffered to some extent when it hits the baffle 30, so as to prevent the parts of the food feeder from being damaged; when the food feeder collides with the baffle 30, the pressing rod 34 presses the reverse control button 31 of the double-shaft motor 3 to make the double-shaft motor 3 reverse, and the control box 11 controls the electric telescopic push block 9 to retract while receiving the signal of the reverse control button 31 to prevent the electric telescopic push block 9 from colliding with the toggle lever 14.

The stirring mechanism comprises a connecting rod 19 rotatably connected between two opposite side walls of the storage box 18, and a plurality of groups of stirring rods 20 are connected to the connecting rod 19; an outer wall of one side of the storage box 18 is provided with a first motor 21, and a shaft end of the first motor 21 passes through a side wall of the storage box 18 and is connected with one end of the connecting rod 19.

The height of a lower end of the toggle lever 14 is lower than a height of an upper side of the electric telescopic push block 9 after extending out.

When the present invention is implemented, the same feed and medicine are put into the storage box 18, the first motor 21 is started, and the first motor 21 drives a plurality of groups of stirring rods 20 on the connecting rod 19 to stir the feed and medicine; the second motor 3 is started, which drives the travelling wheel 5 at the other end of the rotating shaft 4 to rotate, so that the travelling wheel 5 moves along the track 29.

When the rotating shaft 4 rotates, the outer gear 6 is driven to rotate. The two groups of gears 6 are matched with the meshing teeth 8 on the inner side of the conveyor belt 7 to drive the conveyor belt 7 to rotate counterclockwise, and the electric telescopic push blocks 9 on the outer side of the conveyor belt 7 are in an extended state at the initial state.

After moving to the right of the lower end of the toggle lever 14, a group of electric telescopic push blocks 9 continue to move, pushing the lower end of the toggle lever 14 to move to the left, so that the upper end of the toggle lever 14 drives the articulated telescopic lever 13 to move to the right.

When the toggle lever 14 rotates along the cross bar 15, the springs 16 on both sides are tightened, and after the upper end of the toggle lever 14 leaves the control button 12, the control button 12 transmits a signal to the control box 11, and the second motor 25 and the material control valve 28 are turned on through the control box 11, so that the food in the storage box 18 is conveyed to the material conveying pipe 26 through the screw shaft 24 and sprayed to the fish pond through the material spraying head 27. When a group of electric telescopic push blocks 9 move to the left of the lower end of the toggle lever 14, the upper end of the toggle lever 14 is continuously pressed on the control button 12 by the resilience of the spring 16, so that the second motor 25 and the material control valve 28 are turned off, and the spraying of food is stopped until the next group of electric telescopic push blocks 9 move to the right of the lower end of the toggle lever 14, and the above work flow is circulated to continue spraying food.

The present invention and its embodiments have been described above, and the above description is not intended to limit the present invention. What is shown in the drawings is only one of the embodiments of the present invention, and the actual structure is not limited thereto. In a word, structural modes and embodiments made by those skilled in the art with the teaching of the present invention without departing from creative purpose of the present invention shall fall into the protection scope of the present invention.

What is claimed is:

1. An automatic food feeder for aquatic breeding, comprising a bottom plate (1), wherein a lower side of the bottom plate (1) is provided with a driving mechanism; the driving mechanism comprises four groups of rotating shafts (4) located at the lower side of the bottom plate (1); gears (6) are sleeved outside two groups of rotating shafts located at a front side, and a conveyor belt (7) is connected between two groups of the gears (6); an inner side of the conveyor belt (7) is uniformly provided with a plurality of groups of meshing teeth (8) matched with the gears (6); an outer side of the conveyor belt (7) is uniformly provided with a plurality of groups of electric telescopic push blocks (9); an upper side of the bottom plate (1) is provided with a placing rack (10); a front part of a lower side of the placing rack (10) is provided with a control box (11), a telescopic rod (13) is hinged at a lower side of the placing rack (10) and a right side of the control box; a toggle lever (14) is hinged at a lower end of the telescopic rod; one side of a front part of the bottom plate (1) is provided with a rectangular through hole (17), and a lower part of the toggle lever (14) passes through the rectangular through hole (17); a cross bar (15) rotates through and is connected with part of the toggle lever (14) located at an inner side of the rectangular through hole; the two ends of the cross bar (15) are respectively rotatably connected with the front and rear side walls of the rectangular through hole (17); a spring (16) is sleeved outside the cross bar (15), and one end of the spring (16) is provided with the toggle lever (14) and the other end is provided with an inner side wall of the rectangular through hole (17); a storage box (18) is connected to an upper side of the placing rack (10), and a stirring mechanism is arranged in the storage box (18); a discharge pipe (22) pass through one side of a lower side wall of the storage box (18), and a lower end of the discharge pipe (22) has a plate structure; a second motor (25) is connected above the bottom plate (1) and below a lower end of the discharge pipe (22); a screw shaft (24) is arranged in the discharge pipe (22), and a sealing bearing (23) passes through a center of the lower side wall of the discharge pipe (22); a low end of the screw shaft (24) passes through an inner side of the sealing bearing (23) in a sealing manner and connected with a shaft end of the second motor (25); a low part of a rear side wall of the discharge pipe (22) is communicated and connected with a material conveying pipe (26), and the other end of the material conveying pipe (26) is provided with a material spraying head (27).

2. The automatic food feeder for aquatic breeding according to claim 1, wherein the driving mechanism further comprises a support plate (2) located at a lower side of the bottom plate (1) and connected to left and right sides; a double-shaft motor (3) is connected to a lower side of the support plate (2), and two shaft ends of the double-shaft motor (3) are respectively connected with the rotating shaft (4), and the other end of the rotating shaft (4) is connected with a traveling wheel (5); a track (29) matched with the traveling wheel (5) is arranged below the traveling wheel (5) and placed on the ground, and two ends of the track (29) are connected with baffles (30).

3. The automatic food feeder for aquatic breeding according to claim 2, wherein two groups of damping rods (32) are respectively connected at the centers of the left and right sides of the bottom plate (1); a push plate (33) is connected between the other ends of the two groups of damping rods (32); a pressing rod (34) is provided at one side of the push plate (33) close to the bottom plate (1) and between the two groups of damping rods (32); reverse control buttons (31) matched with the double-shaft motor (3) are provided the left and right sides of the bottom plate (1) and between the two groups of damping rods (32).

4. The automatic food feeder for aquatic breeding according to claim 1, wherein the stirring mechanism comprises a connecting rod (19) rotatably connected between two opposite side walls of the storage box (18), and a plurality of groups of stirring rods (20) are connected to the connecting rod (19); an outer wall of one side of the storage box (18) is provided with a first motor (21), and a shaft end of the first motor (21) passes through a side wall of the storage box (18) and is connected with one end of the connecting rod (19).

5. The automatic food feeder for aquatic breeding according to claim 1, wherein a height of a lower end of the toggle lever (14) is lower than a height of an upper side of the electric telescopic push block (9) after extending out.

6. The automatic food feeder for aquatic breeding according to claim 1, wherein the material conveying pipe (26) is provided with a material control valve (28).

\* \* \* \* \*